United States Patent [19]
Wurz et al.

[11] Patent Number: 5,661,561
[45] Date of Patent: Aug. 26, 1997

[54] DIMENSIONING SYSTEM

[75] Inventors: Albert Wurz, Doylestown; John E. Romaine, Bethlehem, both of Pa.; David L. Martin, West Trenton, N.J.

[73] Assignee: Accu-Sort Systems, Inc., Telford, Pa.

[21] Appl. No.: 459,342

[22] Filed: Jun. 2, 1995

[51] Int. Cl.⁶ ............................................. G01B 11/10
[52] U.S. Cl. ................... 356/386; 356/376; 356/380; 356/383; 250/223 R; 250/559.29
[58] Field of Search ........................... 356/386, 376, 356/380, 383; 250/561, 223 R

[56] References Cited

U.S. PATENT DOCUMENTS

| | | | |
|---|---|---|---|
| 4,063,820 | 12/1977 | Borgese | 356/167 |
| 4,105,925 | 8/1978 | Rossol et al. | 250/561 |
| 4,158,507 | 6/1979 | Himmel | 356/376 |
| 4,227,813 | 10/1980 | Pirlet | 356/372 |
| 4,411,528 | 10/1983 | Newcomb et al. | 356/375 |
| 4,492,472 | 1/1985 | Asano et al. | 356/376 |
| 4,645,917 | 2/1987 | Penney et al. | 250/201 |
| 4,741,621 | 5/1988 | Taft et al. | 356/376 |
| 4,758,093 | 7/1988 | Stern et al. | 356/376 |
| 4,794,262 | 12/1988 | Sato et al. | 250/560 |
| 4,812,639 | 3/1989 | Byren et al. | 250/203 |
| 4,885,461 | 12/1989 | Mattila et al. | 250/223 |
| 4,891,530 | 1/1990 | Hatji | 250/572 |
| 4,906,098 | 3/1990 | Thomas et al. | 356/376 |
| 4,929,843 | 5/1990 | Chmielewski, Jr., et al. | 250/561 |
| 4,939,379 | 7/1990 | Horn | 250/560 |
| 4,989,981 | 2/1991 | Kawamura et al. | 356/394 |
| 5,085,516 | 2/1992 | Bertrand et al. | 356/394 |
| 5,193,120 | 3/1993 | Gamache et al. | 382/1 |
| 5,200,799 | 4/1993 | Maruyama et al. | 356/394 |
| 5,416,591 | 5/1995 | Yoshimura et al. | 356/380 |

FOREIGN PATENT DOCUMENTS

| | | | |
|---|---|---|---|
| 2189594 | 10/1987 | United Kingdom | B01B 11/00 |
| WO9427166 | 11/1994 | WIPO | G01S 17/88 |
| WO9612931 | 5/1996 | WIPO | B01B 11/06 |

*Primary Examiner*—Frank G. Font
*Assistant Examiner*—Reginald A. Ratliff
*Attorney, Agent, or Firm*—Volpe and Koenig, P.C.

[57] ABSTRACT

The present invention provides a dimensioning system for determining the minimum size box necessary to enclose an object traveling on a moving conveyor. The dimensioning system is comprised of a light source which generates a scan beam that is moved by a mirrored wheel. A line scan camera whose field of view tracks the moving scan beam receives images of the scan beam and outputs a signal which is processed to compute a three dimensional box structure of the scanned object.

19 Claims, 8 Drawing Sheets

DIMENSIONING SYSTEM

BACKGROUND OF THE INVENTION

1. Field of the Invention

The present invention relates to an apparatus for determining the dimensions of an object. More particularly, it relates to a dimensioning apparatus for determining the minimum size box necessary to enclose an object. Most particularly, the invention is directed to an automatic dimensioning system which accurately determines the dimensions of an object on a moving conveyor for package sorting and handling applications.

2. Description of the Prior Art

In order to reduce costs and increase the volume of packages handled, the shipping industry has pressed automated package handling. This has been accomplished through automated package identification by bar code labeling and automated sortation by scanners identifying the labels and routing the packages. Package sorting is typically done based on the package size. In the shipping industry, shipping fees are directly related to the package size, weight and shipping destination. Determining the correct package size in an efficient manner is therefore especially significant for both throughput and fee calculation.

While some progress has been made to provide automated systems for creating a three dimensional rendering of the package, the known systems are both complex and costly. There are several known systems for obtaining package dimensions. One system, shown in U.S. Pat. No. 5,193,120, utilizes a light source which projects collimated lines of light onto the object to be measured. An imaging system, utilizing a video camera, views the object at an angle with respect to the structured light so that the profile of the object can be visualized. The video signal is processed to to calculate the three dimensional rendering of the object based on the lines of light.

An apparatus which determines an object's height is shown in U.S. Pat. No. 4,929,843. This system utilizes a laser beam which is rastered across a conveyor surface creating a light stripe. A television camera, having a defined field of view, views the object at an angle causing the apparent location of the light stripe to move based on the object height.

Although the known systems can be used to obtain an object's height or to provide a three dimensional rendering, both systems view the object area at an angle, then produce a large analog video signal which must be filtered and processed.

In order to increase the efficiency and reduce the cost of a dimensioning system, it is desirable to have a low cost, automated means for providing an accurate, high speed rendering of an article as it is carried on a conveyor. This object can be, accomplished by reducing the amount of visual data processed.

SUMMARY OF THE INVENTION

The present invention provides a dimensioning system for determining the minimum size box necessary to enclose an object traveling on a moving conveyor. The dimensioning system is comprised of a light source which generates a scan beam that is moved by a mirrored wheel. A line scan camera whose field of view is also moved by a mirrored wheel receives images of the scan beam and outputs a serial analog waveform which is processed to compute a three dimensional box structure of the scanned object. Further processing is necessary for those objects that have complex curves.

It is an object of the invention to provide a dimensioning system which scans a three dimensional object on a moving conveyor belt and calculates a box capable of enclosing the object.

Other objects and advantages of the system will become apparent to those skilled in the art after reading the detailed description of a presently preferred embodiment.

DESCRIPTION OF THE PREFERRED EMBODIMENTS

Figure 1:
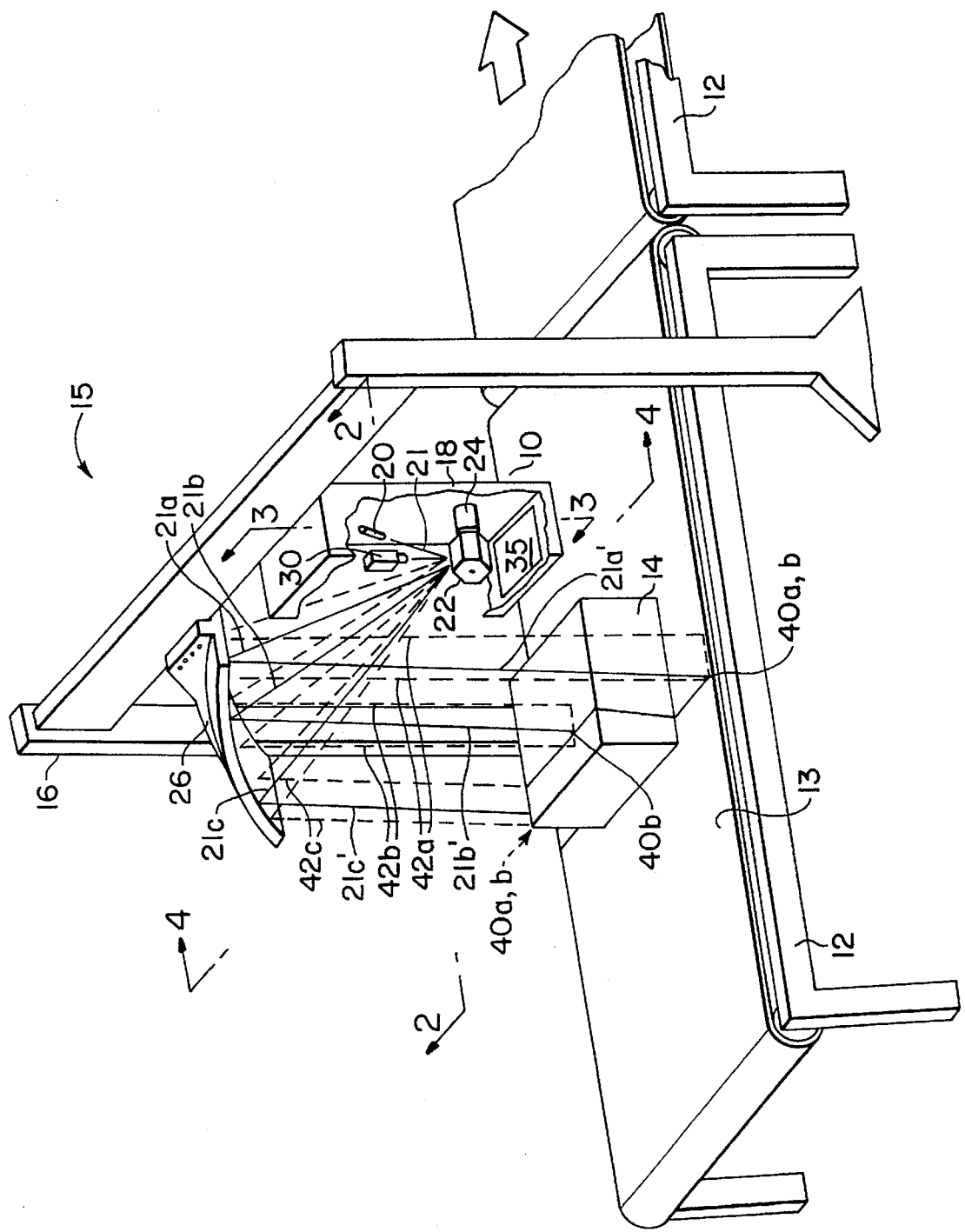
FIG. 1 is a perspective view of a dimensioning system in position above a conveyor.

The preferred embodiment will be described with reference to the drawing figures where like numerals represent like elements throughout.

A dimensioning system 15 in accordance with the present invention is shown in FIG. 1. The dimensioning system 15 is positioned above a conveyor section 12 carrying an object 14. The dimensioning system 15 is comprised Of a main unit 10 and a parabolic reflecting surface 26. The dimensioning system is mounted on a stand 16 above a conveyor section 12 carrying an object 14. The main unit 10 is enclosed in a housing 18 which is made by conventional means of sheet metal or molded plastic. Only a portion of the housing 18 is illustrated in order to show the components of the dimensioning system 15 contained therein.

The dimensioning system 15 is comprised of a laser diode and lens assembly 20 mounted in the housing 18. The laser assembly 20 produces a coherent, collimated beam 21 which is directed toward a six-sided, multi-faceted mirrored wheel 22. The mirrored wheel 22 is driven by a motor 24, which moves beam 21 as it is reflected from the turning mirrored wheel 22. This produces a series of continuous beams, which have been graphically represented by 21a, 21b and 21c. The series of beams 21a, 21b and 21c are directed toward a high quality, parabolic reflecting surface 26 which reflects the series of beams 21a, 21b and 21c to produce a scan of the conveyor belt surface 13 normal to the direction of travel.

Figure 4:
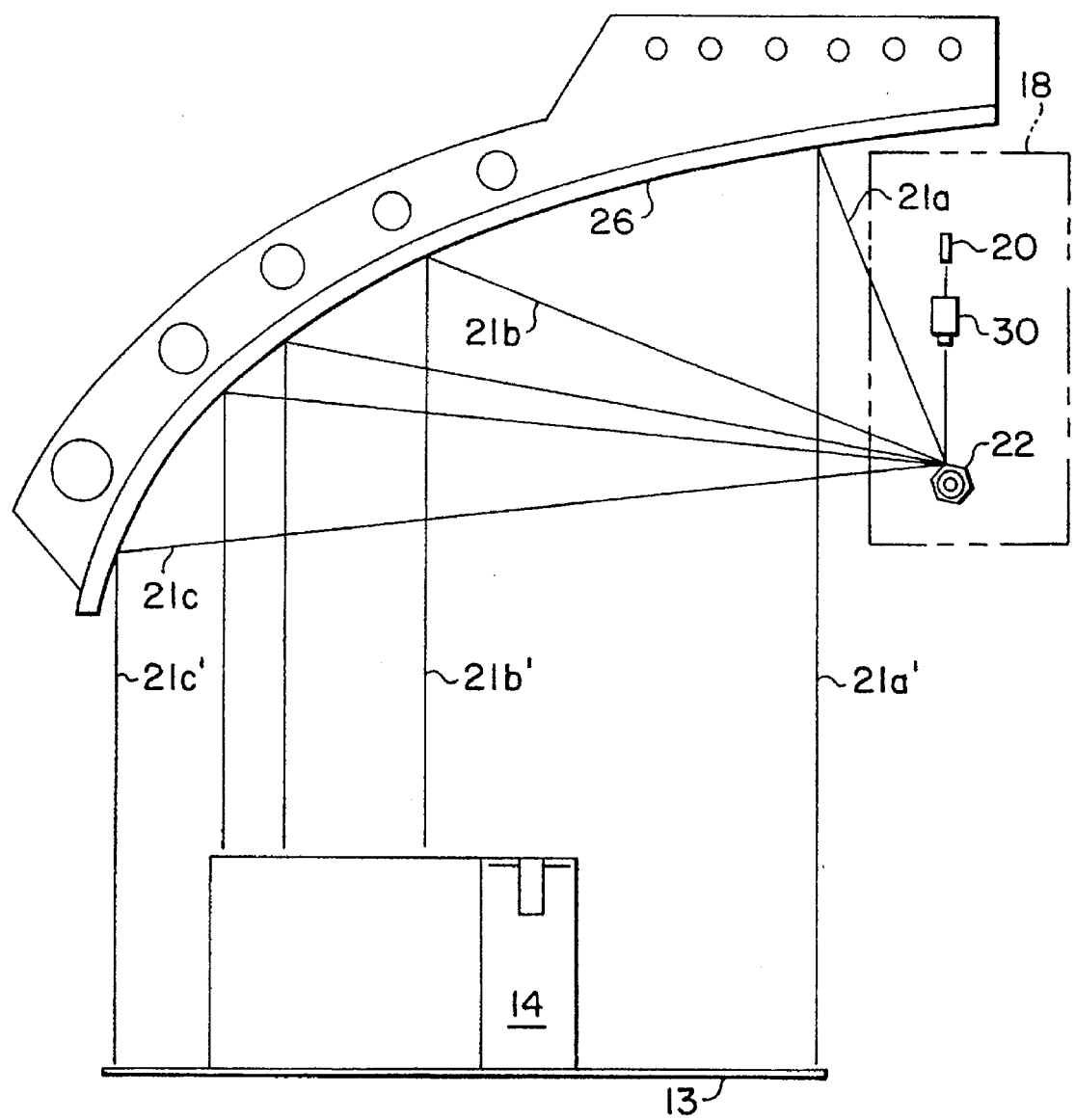
FIG. 4 is a view along line 4—4 in FIG. 1.

As graphically illustrated in FIG. 4, the parabolic surface 26 is used to produce parallel beams 21a', 21b', and 21c' from the mirrored wheel 22 and direct them onto the conveyor belt 13. The mirrored wheel 22 is located at the focus of the parabolic reflecting surface 26. If the laser beam 21 is moved directly from the mirrored wheel 22 to the belt 13, the scan beams would radiate from a point source and cast shadows from adjacent objects onto each other. By making the scan beams parallel from above, no shadowing occurs.

In the preferred embodiment, the laser diode/lens assembly is a Mitsubishi 35 mW, 690 nm laser diode with an aspheric glass lens having a 6.24 mm focal length. Referring back to FIG. 1, the motor 24 and the motor control circuitry 25 is designed to minimize motor drift. In the preferred embodiment, the motor speed is constantly 533 rpm.

A CCD (charged coupled device) line scan camera 30 is mounted in the housing 18 and directed toward the mirrored wheel 22. The camera 30 has a line field of view 42. As the mirrored wheel 22 turns, the line field of view 42 is directed to corresponding positions (represented as 42a, 42b and 42c) with the series of scan beams 21a, 21b and 21c. The camera 30 outputs a serial analog signal to the logic processor 35 mounted in the housing 18.

Figure 3:
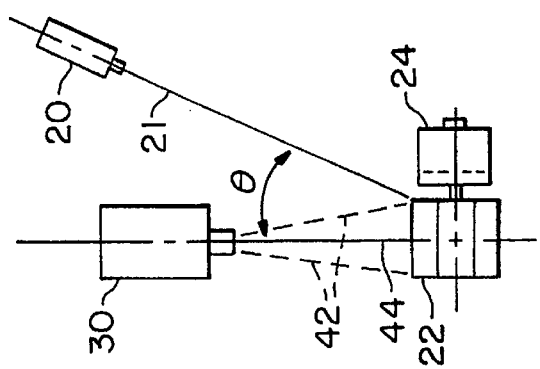
FIG. 3 is a view along line 3—3 in FIG. 1.
Figure 2:
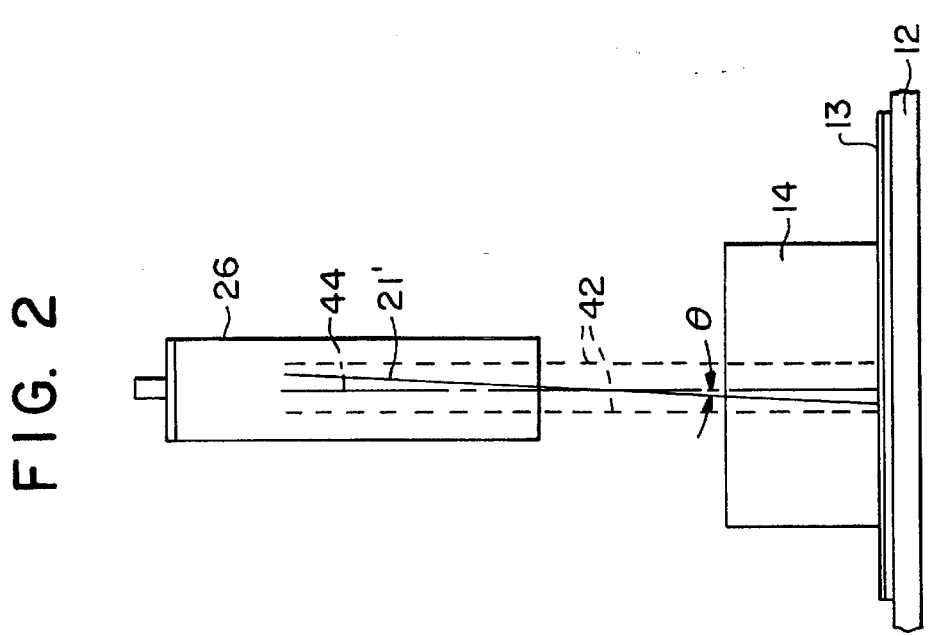
FIG. 2 is a section view along line 2—2 in FIG. 1.

The mounting geometry of the laser assembly 20, camera 30, mirrored wheel 22 and parabolic reflecting surface 26 is shown in detail in FIGS. 2–4. The laser assembly 20 and the camera 30 are mounted on a plane which is parallel to the axis of the mirrored wheel 22. As shown in FIG. 3, the laser assembly 20 and the camera 30 are offset from each other by an angle θ which is approximately 5°. θ is defined by measuring the angle between the laser beam center 21 and the central axis 44 of the field of view 42 of the camera 30.

As shown in FIGS. 2 and 4, the mirrored wheel 22 sweeps the laser beam 21 across the parabolic reflecting surface 26, with approximately 90° of the swept beam 21 striking the parabolic reflecting surface 26. The parabolic surface 26 reflects the laser beam 21 to provide a series of parallel beams 21a', 21b' and 21c'.

The camera field of view 42 is aligned in the same plane as the laser beam 21 and is directed at the mirrored wheel 22. As shown in FIG. 2, the central axis 44 of the field of view 42 is reflected by the parabolic reflecting surface 26 to be approximately normal to the conveyor surface. The angle of the parallel laser beam 21' after reflecting off of the parabolic surface 26, remains θ from the central axis 44 of the camera field of view 42.

Figure 5:
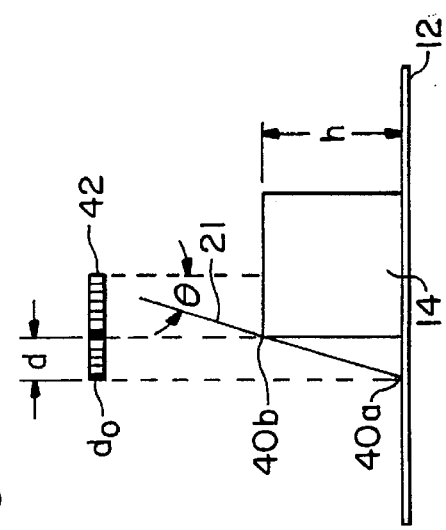
FIG. 5 is an explanatory diagram which indicates how the offset distance is measured and the height of the object is calculated.

The object height 14 at a given point is measured by triangulation using the angle θ. The offset angle θ between the laser beam 21' and the normal camera view field 42 above the conveyor creates a horizontal offset d between intercept point 40a where the laser beam normally intercepts the conveyor surface and image point 40b when the laser beam 21 strikes an object 14. As shown in FIG. 5, the offset d is captured by the linear view field 42 of the camera 30. When the intercept point 40a and the image point 40b are the same, i.e. when no object is present, the image is oriented to fall at one end of the CCD linear array $d_0$. As an object comes under the scan beam 21, the image point 40b moves toward the other end of the CCD array based on the object height at that discrete point on the conveyor belt. The calculation of offset d, the distance from $d_0$ is explained in more detail hereinafter.

Figure 6:
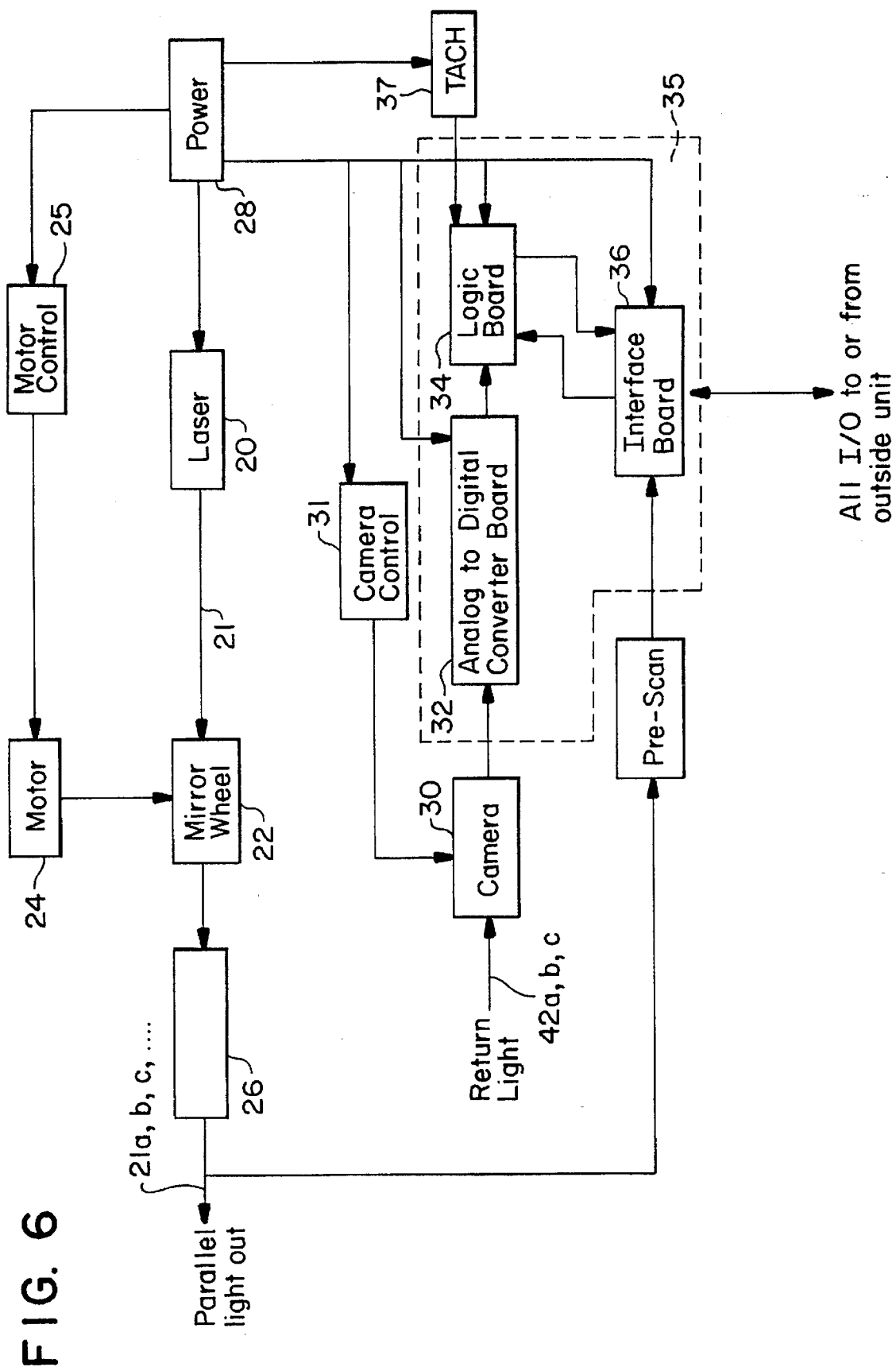
FIG. 6 is a block diagram of the system.

The output of the camera 30 is fed to the input of the A/D (analog to digital) converter 32 as shown in FIG. 6. The A/D output is a binary digital pulse corresponding to the position of the laser spot.

In the preferred embodiment, the line scan camera 30 is a Dalsa model CL-C3. The lens has a focal length of 170 mm. To maintain focus over the 36 inch depth of field, the CCD array is tilted at an angle in relation to the median plane through the lens. The angle of tilt is determined using the Scheimpflug condition. The angle is dependent on the focal length of the lens and the plane angle of the object. The plane angle of the object is projected towards the lens. The median plane of the lens is extended to intersect the object plane's extended line. The image plane's line is similarly extended to intersect at the same point. For the three lines to intersect, the image plane must be angled. The angle that causes the three extended lines to intersect is the Scheimpflug angle. The angular relationship is achieved by the spacial relationship and orientation between the object on the conveyor, the reflected light path, and lens and CCD array. The CCD array must then be slightly offset such that the object sample points are imaged onto the active area of the CCD array. The use of the Scheimpflug condition allows for a smaller reflected laser spot size over the entire depth of field. This yields increased resolution.

The CCD array contains 512 pixels. The maximum scan height is 36 inches, which yields a resolution of 0.07 inch per pixel. The camera 30 takes between 28 and 55 microseconds to integrate and clock out the pixels after integration. 28 microseconds is the minimum amount of time to clock out the signal.

The camera control circuitry consists of a pixel clock and a cycle clock. The cycle clock controls the integration time and the pixel clock controls the rate at which the pixels are clocked out. The cycle clock is synchronized with the scans such that it pulses 240 times (per scan) as it moves across the conveyor belt surface (at 0.25 inch increments) starting at scan zero (the conveyor belt edge). The pixel clock is synchronized with the A/D converter to admit the serial data stream.

A block diagram of the dimensioning system 15 is shown in FIG. 6. The components required to output parallel light and to receive the return light have been described above.

After the camera 30 receives the return light, the CCD light-sensitive pixels accumulate a charge proportional to the intensity of the exposure. The output is an analog waveform where the voltage is proportional to the intensity of return light. The laser spot can be modeled with a Gaussian distribution. It is then input to the processor 35.

The processor 35 is comprised of an A/D converter 32 which accepts the analog signal from the camera 30 and outputs a digital signal. The converter uses a fixed level comparator circuit to digitize the analog waveform from the camera 30. In the first stage of the A/D process, the incoming signal is filtered from unwanted noise and amplified. The following stages provide variable gain. The final section performs the A/D conversion which produces a binary output pulse.

The logic board 34 accepts the binary signal from the A/D converter 32. The signal is a single pulse corresponding to the reflected image point detected by the CCD array in the camera 30. When the LVAL output from the scanner is set high (a signal that indicates the camera is clocking out its pixels) the leading edge is used as a starting point to measure the distance to the laser spot pulse. Two 12 bit, 60 Mhz counters are started at the rising edge of the LVAL signal. The first counter is stopped and stored in memory at the leading edge of the laser spot pulse indicating the laser beam image point 40b, and the second counter is stopped and stored in memory at the falling edge of the signal. The processor 35 calculates the difference between the edge values and this represents the center of the laser beam image point 40b. This number is converted to a distance d that the laser image point 40b is apart from the conveyor intercept point 40a $d_0$. Using this distance d and the angle θ, the box height is calculated.

The height h is calculated by the logic board 34 using the simple trigonometric relationship:

$$h = \frac{d}{\tan\theta} \quad \text{(Eqn. 1)}$$

This relationship can be grouped with the conversion of the counters to a distance in one step. By doing this for each point, the center count can be converted directly to a height. By creating a lookup table, any variation between units in processing can be calibrated out.

Each time d is measured the height h is calculated at that discrete point. Measurements of the beam image points are taken as the scan progresses across the conveyor 12 at preferably 0.25 inch intervals. This yields 240 discrete sample image points per scan. A tachometer 37, measures the conveyor belt speed, and based on the scan frequency, the distance between scans is calculated.

Each sample image point is composed of an x, y, z component. The x component is the distance, in discrete 0.0625 inch increments, obtained from counting the tachometer pulses. The y component is the distance, in discrete 0.25 inch increments, from the scan zero side of the conveyor. The z component is the object height h, in 0.0625 inch increments, from the belt towards the parabolic reflecting surface as measured by the laser-camera interaction.

Figure 7:
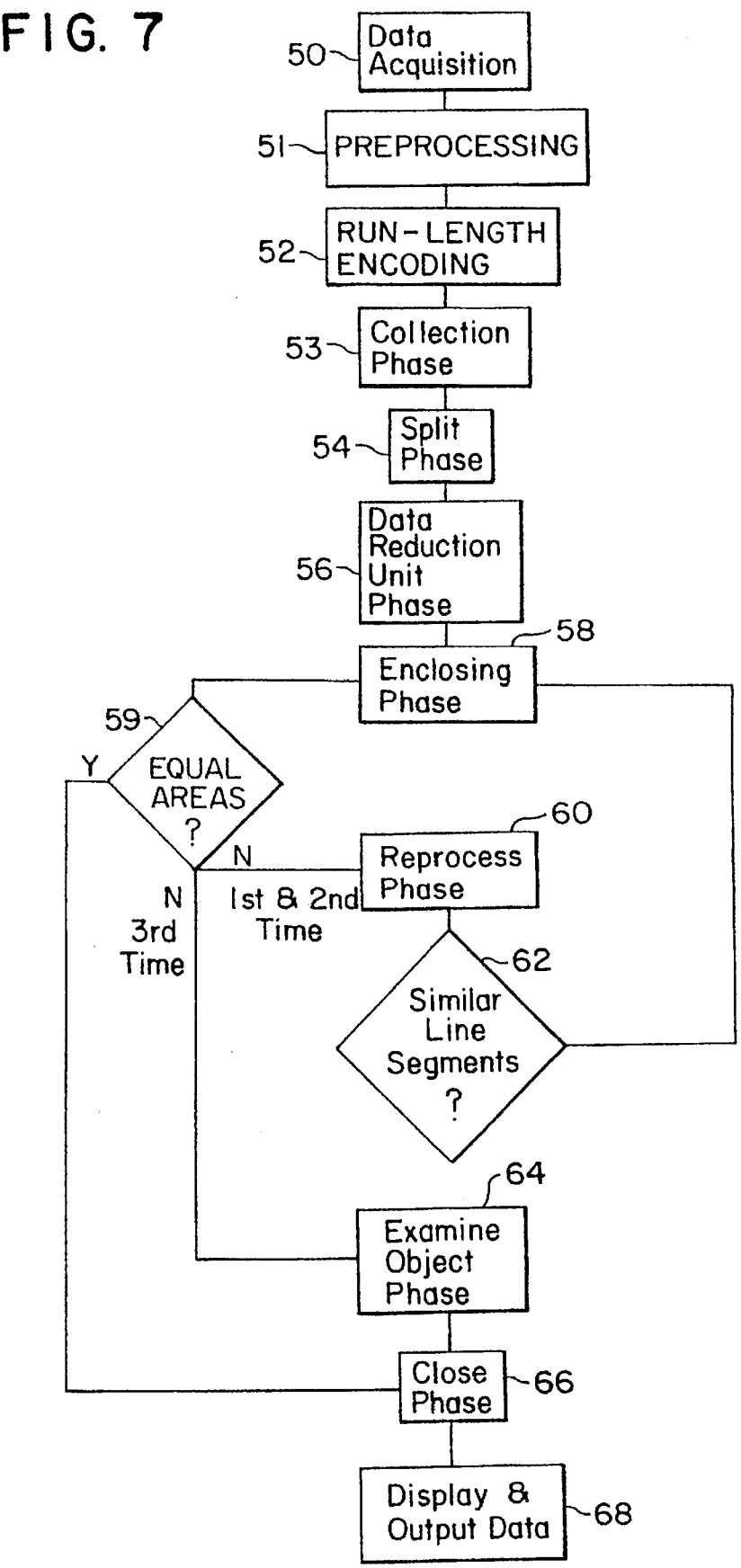
FIG. 7 is a flow chart of the enclosing process.

As shown in the flow diagram of FIG. 7, once the data is acquired (step 50), it is process to define a box structure. After a scan has been completed, the data from the 240 sample points are fed into a preprocessor function (step 51) in the software. The purpose of the preprocessor is to convert the raw height data from the camera into 0.07 inch increments, and to removed calibrated aberrations from the data. For example, if sample image point number 5 is always 2 counts larger than the average, the data contained in sample 5 will be lowered by 2 counts.

One the preprocessor has normalized the data, it is fed into a run-length encoder module (step 52). The run-length encoder takes the 240 discrete height samples and converts the entire scan into multiple line segments. Line segments are constructed from groups of adjacent sample image points with similar non-zero heights that lie on the same scan line. Each line segment is defined by its starting position on the conveyor belt, length, and height. Line segments are no longer discrete, their components are averages of the discrete points they were built from. As shown in the flow diagram, one the data is acquired, and preprocessed, the line segments are then passed to the collection phase. During the data collection phase the incoming line segments are assigned to a particular box structure according to their position to the previously gather line segments.

During the collection phase (step 53) individual line segments may contain information for more than one object. If the data for the second object is apparent due to trends in the previously gathered data, the line segment will be broken into two line segments and assigned normally. If the line segment cannot be broken it will be assigned normally to the closest matching box structure, therefore this box structure will now contain the information for more than one object, the split phase (step and examine object phase (step 64) should remove this extra information later on.

If during a particular data collection period a box structure did not receive at least one single line segment, indicating the absence of the object in the current scan line, that box structure is passed to the split phase.

During the split phase (step 54) the software examines the outer edges of the image defined by the box structure. If the split module notices drastic changes in the slope of line segments contained in the box structure, the module will break the box structure down into multiple box structures. Each of these box structures will contain tag information to rebuild the original box structure is the slopes were misinterpreted. All of this data will then pass to the data-reduction-unit.

During the data reduction unit phase (step 56) all line segments that do not touch the edges of the calculated box structure image are deleted. This is accomplished by deleting any line segment where the end points do not touch or exceed the previous or next scan line segment's end points. This decreases the processing time during the enclosing phase.

The enclosing phase (step 58) encloses the imaged object within the smallest box structure. To enclose the object, the angular orientation of a first side must be determined and then two perpendicular sides and an opposing parallel side are calculated such that the area within is minimized and contains all of the line segments. In order to determine the angular orientation of a first side points are defined from the line segment data comprising the box structure.

Figure 8A:
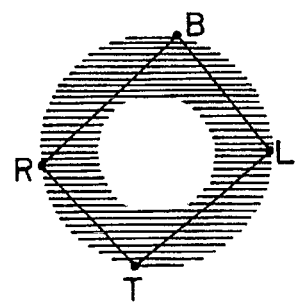
FIG. 8A is an illustration of how the enclosing process determines the first four points.

As shown in FIG. 8A, the T point is the beginning of the first line segment in the box structure, and has the minimum x value. The B point is the end of the last line segment, and has the maximum x value. The R point is the beginning of the line segment closest to the scan zero point, i.e. the minimum y values. The L point is the end of the line segment farthest from scan zero, i.e. the maximum y value.

After these four points, TR, RB, LT, and LT are determined, line segments are computed. For reference the center of the box structure is taken as the point midway between the maximum and minimum x and y values.

Figure 8B:
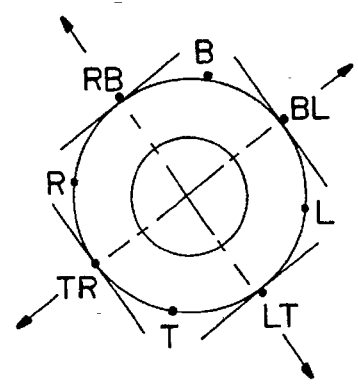
FIG. 8B is an illustration of how the enclosing process determines the second four points.

As shown in FIG. 8B, the line segments $\overline{TR}$, $\overline{RB}$, $\overline{BL}$, and $\overline{LT}$ are moved tangentially away from the center until they enclose all of the individual line segments defining the box structure. The last sample point where each of the computed tangential lines touch a line segment of the box structure defines four new points; TR,RB, BL and LT.

The final part of the enclosing phase involves defining 16 lines, each having its own angular orientation, by the eight points. The first area is comprised of 8 lines are defined one each between each adjacent point, T and TR, TR and R and RB, etc. The second eight lines are defined, one each between every other point, TR and RB, RB and BL, BL and LT, etc. and T and R, R and B, B and L, etc.

Figure 8C:
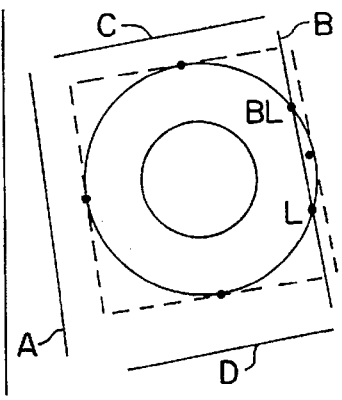
FIG. 8C is an illustration of how the enclosing process boxes a box structure.

Each of the computed lines defines an angle with respect to the conveyor width and running length. For example with respect to the line defined by points BL and L as shown in FIG. 8C, an exaggerated line A is computed parallel to line BL to L, determined lines and moved in from outside of the box structure until it contacts a sample point. Line B is computed parallel to line A and is moved in from the side opposite A. Two additional lines normal to lines A, B are computed, C, D and are moved in to box the box structure. This operation is performed for each of the sixteen lines computed above. The smallest area computed that encloses the box structure is output to the next phase.

A check is performed by calculating the area of the box structure based on all of the edge points and the area within the lines defining a box. If the two areas are approximately equal (step 59), the box is then closed, otherwise the box is sent to reprocessing phase.

During the reprocessing phase (step 60) any extraneous line segments that are not similar (step 62) to the adjacent segments are adjusted until they match adjacent data. The box structure is then passed back to the enclosing phase. If the box structure has been through the reprocessing phase previously, it passes to the examine object phase.

Figure 8D:
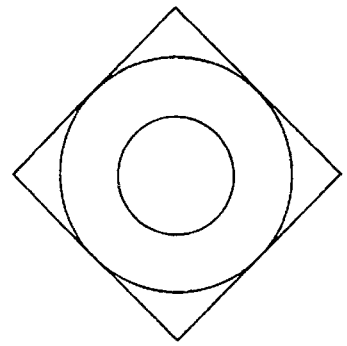
FIG. 8D is an illustration of the examine objects phase.

The examine object phase (step 64) examines the data and recreates a silhouette picture of the object(s) that were scanned. As shown in FIG. 8D, box structures reaching this phase are of irregularly shaped objects, objects touching other objects or objects oriented in such a fashion that the standard process could not accurately enclose them. This phase of the process allows for proper enclosure of tires and separate complex arrangements of touching objects.

The examine object phase of the method generates outlines of the box structures and examines these outlines looking for corners. Concave corners, and corners that indent into the box structures are noted. The corners are connected to form sides of boxes, and matching concave corners are connected to split apart multiple box structures where they meet. The new, individual box structures are then enclosed within the smallest rectangle possible.

The final step of the process is the close phase (step 66) where the box data is displayed and transmitted to a peripheral devices.

It will be recognized to those of ordinary skill in the art that the enclosing process can be tailored to specific applications where known parameters exist. For example, where it is known that only rectangular box-shaped objects will be scanned, the comparison done in step 59 can be made based on a higher approximation of equality since the area of the box structure based on all of the edge points should nearly equal the area of the lines defining the box. Additionally, if it is known that all items being scanned have a uniform height, but different items may have a significantly different height, the split phase step 54 may be configured to look for variations in the uniformity of line segment height as one way to determine the existence of two box structures occurring within the same set of scans.

The software also corrects for offsets in the mirrored wheel facets and for changes in the measured height which are caused by the uneven distances between the mirrored wheel and the surface of the conveyor. As shown in FIG. 4, the scan beam length 21a is greater than the scan beam length 21b. This difference in length follows a simple trigonometric relationship which is programmed into the software.

The memory on the logic board 34 is large enough to store the relevant data and some of the frequently used program code. In the preferred embodiment, there are four 256K×32 SRAM modules aboard. A preferred processor for implementing the software is a Texas Instruments TMS320C30 CMOS digital signal processing integrated circuit.

An error count is kept to log the number of times a sample had to be eliminated because of multiple transitions. The quality of the measurement is also recorded. A scale from 1 to 99 indicates the confidence level that the dimensions are accurate. If there is any doubt about the dimensions, it will be assigned a lower number. This number can be used as a threshold to determine whether the dimensions are accurate enough to be used for billing.

Figure 9:
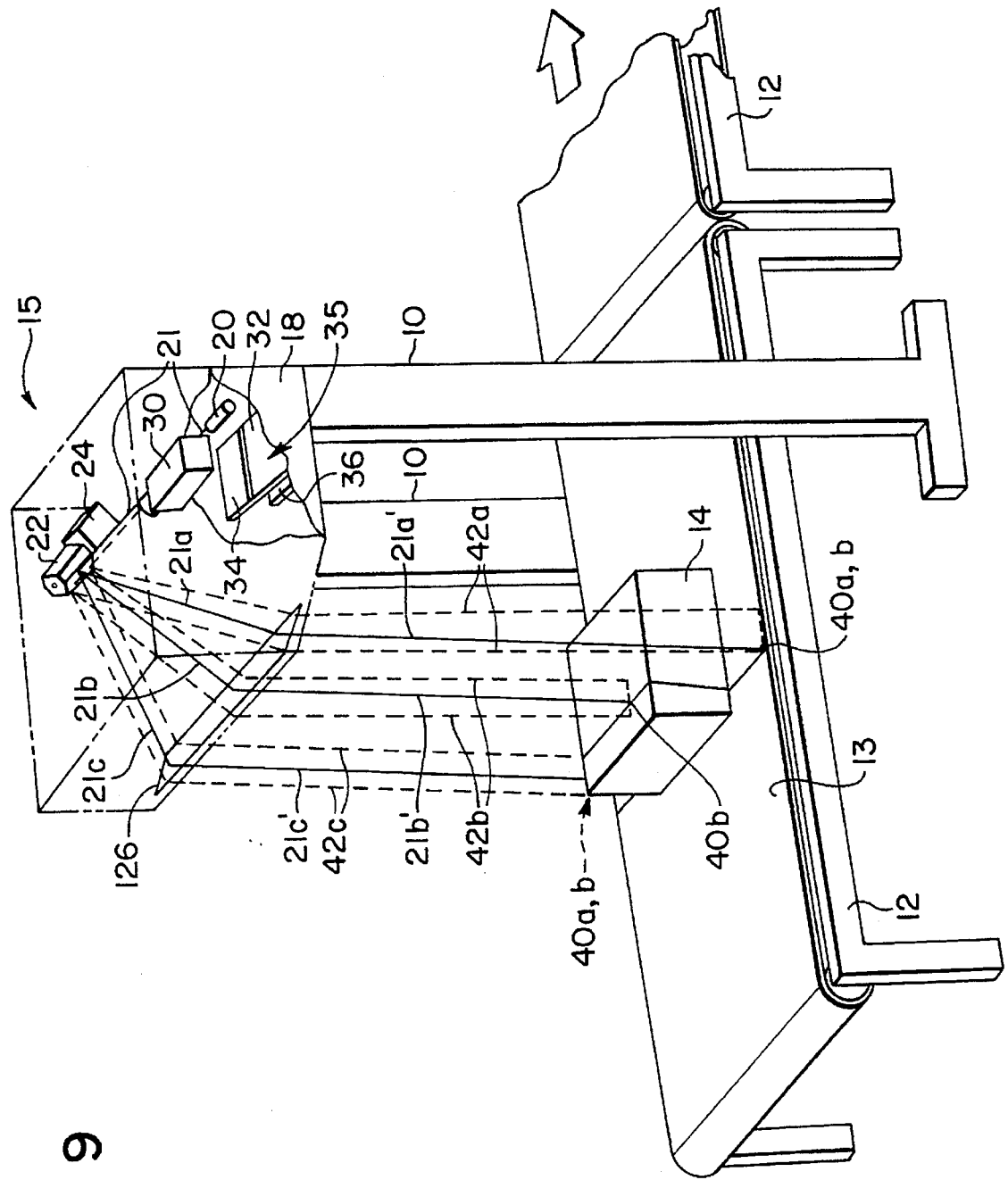
FIG. 9 is a perspective view of an alternative embodiment of the dimensioning system.

While the preferred embodiment utilizes a parabolic reflecting surface 26, an alternative embodiment could use a transmission hologram 126 to collimate the laser beam as shown in FIG. 9. A Fresnel lens could also be used to collimate and refract the individual laser beams in a scan to be approximately parallel to one another.

It is also possible to replace the parabolic reflecting surface 26 with two flat mirrors to approximate a parallel scan. The scan is divided into three parts. The central portion is a direct scan from the mirrored wheel toward the central portion of the conveyor. Because the width of the central portion is limited, shadowing is minimized. The other two portions of the scan will cover the outer portions of the conveyor. Two flat mirrors are angled above the rotating mirrored wheel. The light travels upwards to the mirror and then be reflected down to the conveyor in a near parallel scan. The flat mirrors are approximating the outer regions of a parabola, with the center portion being replaced by a direct scan from the mirrored wheel. This arrangement requires the software to be more complex to correct for the distance and angle changes caused by the additional mirrors and the divided scan.

It is also possible to replace the parabolic surface 26 with a multi-faceted parabolic surface to approximate a parallel scan. The scan is divided into discrete parts. The light travels upwards to the mirror segments and then is reflected down to the conveyor in a near parallel scan. The mirror facets are approximating a true parabolic surface. This arrangement requires the software to be more complex to correct for the distance and angle changes caused by the additional mirrors. In this alternative embodiment, 479 samples are acquired per scan.

Figure 10:
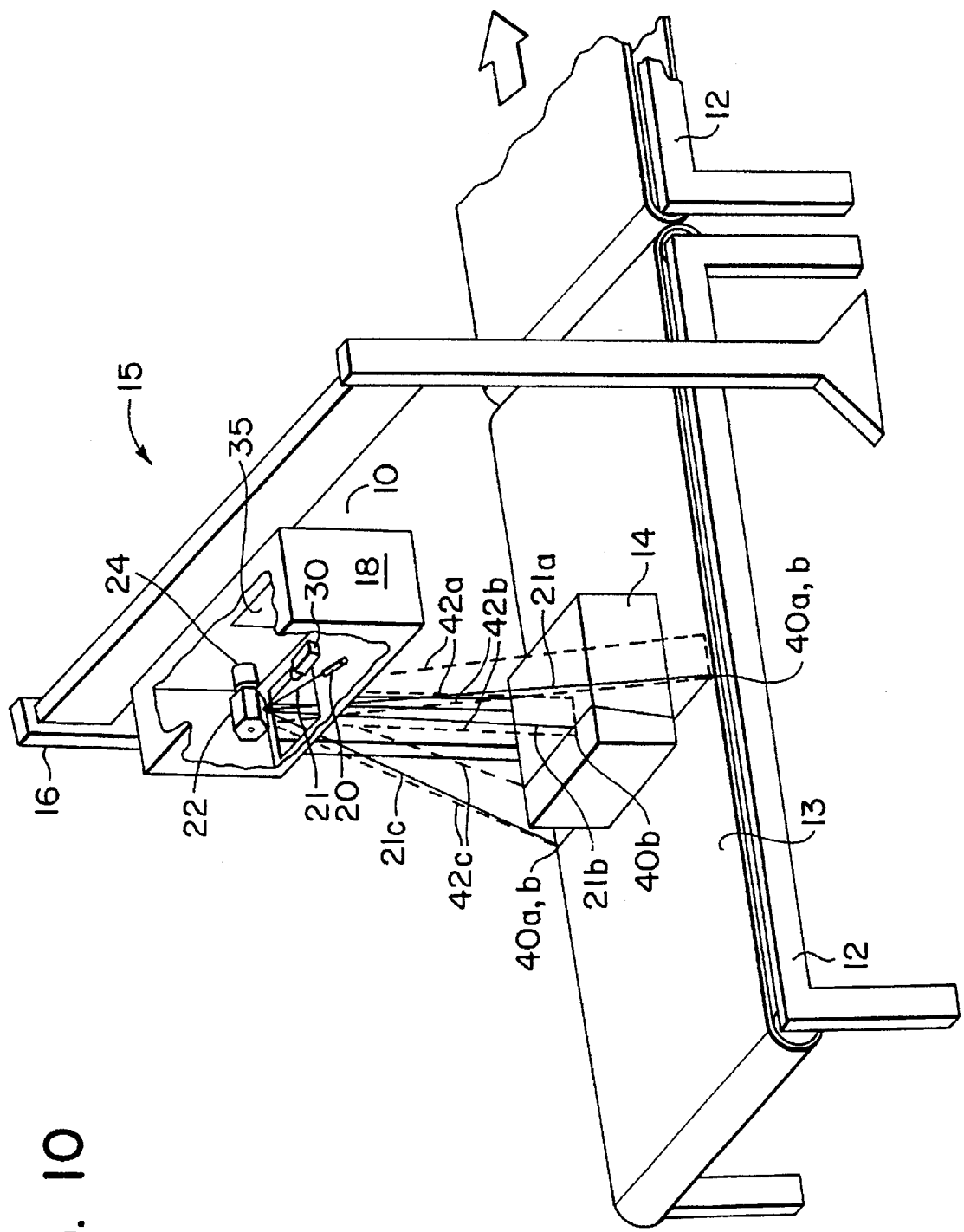
FIG. 10 is a perspective view of a second alternative embodiment of the dimensioning system.

If there is no possibility that more than one object will be present during scanning, no reflecting surface is required. As shown in FIG. 10, the main unit 10 may be used solo with no reduction in accuracy. With only one object under the system at one time, no shadowing can occur. In this situation parallel scanning is unnecessary and the raw, angular scan becomes the preferred embodiment. No external optics are needed and system cost and size can be reduced.

While the preferred embodiment uses a line scan camera, an alternative embodiment could use a PSD (position-sensitive detector). The PSD outputs a current which is relative to where the reflected laser spot is detected. The processing of the output is simplified since the output current relates position without having coefficient luminance information present.

While the present invention has been described in terms of the preferred embodiment, other variations which are within the scope of the invention as outlined in the claims below will be apparent to those skilled in the art.

We claim:

1. An apparatus for determining the dimensions of an object traveling on a moving conveyor comprising:

means for generating a scan beam that repetitiously moves across the conveyor at a selected location such that the beam intersects any object traveling on the conveyor through said location;

detecting means having a line field of view which is moved in correspondence with the moving beam that receives reflected images of the scan beam at a plurality of points as the beam moves across the conveyor; and means for calculating the height of the object relative to the conveyor at each image point based on the received reflected images.

2. The apparatus of claim 1 wherein the detecting means is a line scan camera that outputs signal which represents a height relative to the conveyor at each image point.

3. The apparatus of claim 2 further comprising a processor which receives the signal, calculates a value of the height at each image point thereby producing height data, stores data from a plurality of image points and compares the data to provide a three dimensional measurement of an object which has traveled through said selected location.

4. The apparatus of claim 2 wherein said line scan camera uses the Scheimpflug condition to maintain focus over a large depth of field wherein:

said line scan camera has a lens and detector array;

said lens and detector array are mounted in a fixed angular relationship with respect to each other and an image plane defined at said selected location; and said lens and detector array having said angular relationship such that an object passing through said selected location is in focus over a depth of field of at least 12 inches relative to the conveyor.

5. The apparatus of claim 4 wherein the orientation of the lens and detector array result in a depth of field of at least 36 inches relative to the conveyor.

6. The apparatus of claim 1 wherein the detecting means is a position-sensitive detector that outputs a current which represents a height relative to the conveyor of the object at each image point.

7. The apparatus of claim 6 further comprising a processor which receives the output current, calculates the height at each image point thereby producing height data, stores data from a plurality of image points and compares the data to provide a three dimensional object which has traveled through said selected location.

8. The apparatus of claim 6 wherein the portion-sensitive detector uses the Scheimpflug condition to maintain focus over a large depth of field wherein:

said position-sensitive detector has a lens and detector array;

said lens and detector array are mounted in a fixed angular relationship with respect to each other and an image plane defined at said selected location; and said lens and detector array having said angular relationship such that an object passing through said selected location is in focus over a depth of field of at least 12 inches relative to the conveyor.

9. The apparatus of claim 8 wherein the orientation of the lens and detector array result in a depth of field of at least 36 inches relative to the conveyor.

10. An apparatus for determining the dimensions of an object traveling on a moving conveyor comprising:

a light source which generates a light beam that is directed at a mirrored wheel to create a moving beam;

means for directing said moving beam across the conveyor at a selected location and at a predetermined angle relative to the conveying surface;

means in the path of the moving light beam for converting the light from an angular scan to a substantially parallel scan;

a detecting means having a line field of view;

means for directing the line field of view at the moving light beam in an angular orientation to the conveying surface which is offset from said predetermined angle with the line field crossing the moving light beam; and said detecting means receiving images at a plurality of image points along the moving beam outputting a signal, a processor which receives the signal, computes the offset distance of the beam intersect point and the object height at the image point, stores data from a locus of points, and compares data from a series of moving scans to provide a three dimensional measurement of the object.

11. The apparatus of claim 10 wherein object height data h is calculated using the formula $$h = \frac{d}{\tan\theta}$$

where $\theta$ is the fixed angle and d is the offset distance within the line field of view from the image point when no object is passing through said conveyor location.

12. The apparatus of claim 10 wherein said directing means and said converting means is a parabolic surface mounted in a selected orientation.

13. The apparatus of claim 10 wherein said directing means and said converting means is a Fresnel lens mounted in a selected orientation.

14. The apparatus of claim 10 wherein said directing means and said converting means is a holographic lens mounted in a selected orientation.

15. The apparatus of claim 10 wherein said directing means and said converting means is a multi-faceted parabolic surface mounted in a selected orientation.

16. The apparatus of claim 10 wherein said detecting means is a line scan camera that outputs a signal which represents a height relative to the conveyor at each image point.

17. The apparatus of claim 16 wherein said line scan camera uses the Scheimpflug condition to maintain focus over a large depth of field wherein:

said line scan camera has a lens and detector array;

said lens and detector array are mounted in a fixed relationship with respect to each other; and said lens and detector array having a selective orientation such that an object passing through said selected location is in focus over a depth of field of at least 12 inches relative to the conveyor.

18. The apparatus of claim 10 wherein the detecting means is a position-sensitive detector that outputs a current which represents a height relative to the conveyor of the object at each image point.

19. The apparatus of claim 18 wherein the position-sensitive detector uses the Scheimpflug condition to maintain focus over a large depth of field wherein:

said position-sensitive detector has a lens and detector array;

said lens and detector array are mounted in a fixed relationship with respect to each other; and said lens and detector array having a selective orientation such that an object passing through said selected location is in focus over a depth of field of at least 12 inches relative to the conveyor.

* * * * *

UNITED STATES PATENT AND TRADEMARK OFFICE
CERTIFICATE OF CORRECTION

PATENT NO. : 5,661,561
DATED : August 26, 1997
INVENTOR(S) : Wurz et al.

It is certified that error appears in the above-identified patent and that said Letters Patent is hereby corrected as shown below:

At column 1, line 36, delete the second occurrence of "to".

At column 1, line 65, delete "a" and insert --the-- therefor.

At column 2, line 45, delete "Of" and insert --of-- therefor.

At column 2, line 59, insert --the-- after "moves".

At column 4, line 60, delete "Mhz" and insert --MHz-- therefor.

At column 5, line 31, delete "process" and insert --processed-therefor.

At column 5, line 40, delete "One" and insert --Once-- therefor.

At column 5, line 51, delete "one" and insert --after-- therefor.

At column 5, line 55, delete "gather" and insert --gathered-- therefor.

UNITED STATES PATENT AND TRADEMARK OFFICE
CERTIFICATE OF CORRECTION

PATENT NO. : 5,661,561
DATED : August 26, 1997
INVENTOR(S) : Wurz et al.

It is certified that error appears in the above-identified patent and that said Letters Patent is hereby corrected as shown below:

At column 5, line 64, insert --54),-- after "step", first occurrence.

At column 6, line 9, delete "is" and insert --if-- therefor.

At column 6, line 25, insert --,-- after "side".

At column 6, line 32, delete "values" and insert --value-- therefor.

At column 6, line 33, delete "i.e." and insert --$i.e.$-- therefor.

At column 6, line 34, delete the first occurrence of "LT" and insert --BL-- therefor.

At column 6, lines 46-47, delete "are" and "one each".

At column 6, line 55, delete "determined lines" and insert --is-- after "and".

UNITED STATES PATENT AND TRADEMARK OFFICE
CERTIFICATE OF CORRECTION

PATENT NO. : 5,661,561
DATED : August 26, 1997
INVENTOR(S) : Wurz et al.

It is certified that error appears in the above-identified patent and that said Letters Patent is hereby corrected as shown below:

At column 6, line 67, insert --a-- after "to".

At column 7, line 14, delete "separate" and insert --separates-- therefor.

At column 7, line 15, insert --(step 64)-- after "phase".

At column 7, line 25, delete "devices" and insert --device-- therefor.

At column 7, line 51, delete "aboard" and insert --on board-- therefor.

At column 8, line 10, delete "be" and insert --is-- therefor.

At column 8, line 31, delete "one" and insert --a-- therefor.

UNITED STATES PATENT AND TRADEMARK OFFICE
CERTIFICATE OF CORRECTION

| | | |
|---|---|---|
| PATENT NO. : | 5,661,561 | |
| DATED : | August 26, 1997 | |
| INVENTOR(S) : | Wurz et al. | |

It is certified that error appears in the above-identified patent and that said Letters Patent is hereby corrected as shown below:

In claim 2, on line 2 thereof, insert --a-- after "outputs".

In claim 10, on line 17 thereof, insert --,-- after "beam".

In claim 12, on line 2 thereof, delete "is" and insert --are-- therefor.

In claim 13, on line 2 thereof, delete "is" and insert --are-- therefor.

In claim 14, on line 2 thereof, delete "is" and insert --are-- therefor.

Signed and Sealed this

Twenty-fifth Day of November, 1997

*Attest:*

BRUCE LEHMAN

*Attesting Officer*  *Commissioner of Patents and Trademarks*